Sept. 8, 1942.  C. A. WOODWARD  2,295,444
FASTENER FOR HANDLES AND OTHER INSTALLATIONS
Filed July 20, 1940
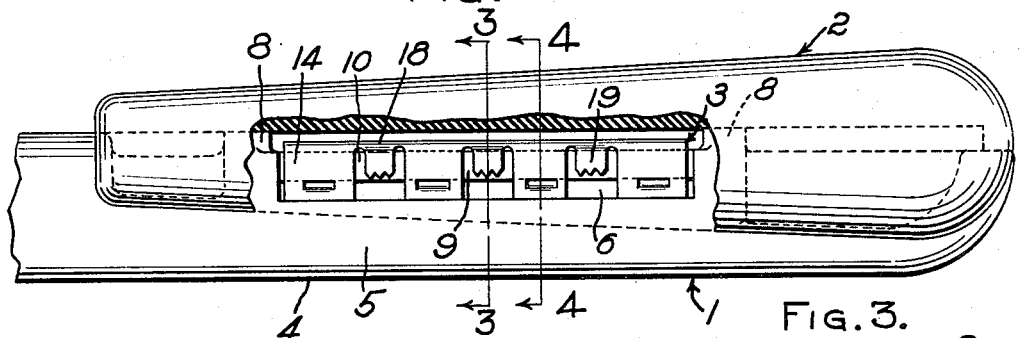
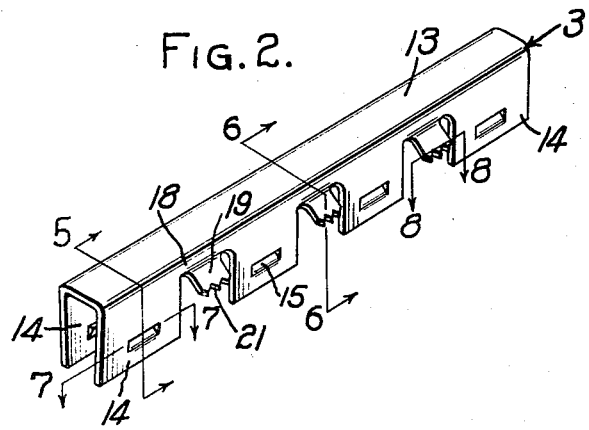
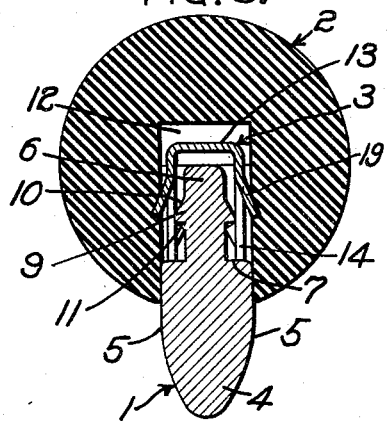
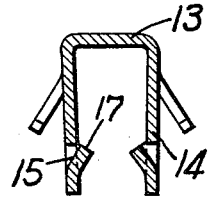
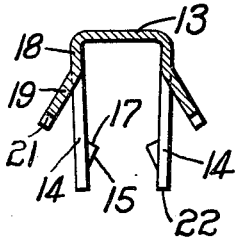
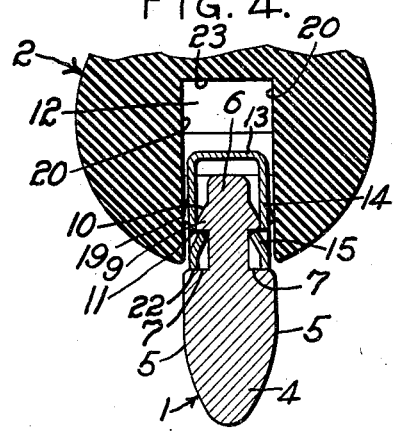
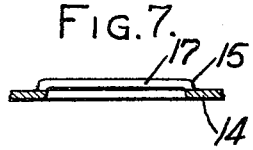
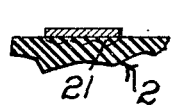
INVENTOR:
CLEMENT A. WOODWARD,
BY John Todd ATT'Y.

Patented Sept. 8, 1942

2,295,444

UNITED STATES PATENT OFFICE 2,295,444

FASTENER FOR HANDLES AND OTHER INSTALLATIONS

Clement A. Woodward, Dedham, Mass., assignor to United-Carr Fastener Corporation, Cambridge, Mass., a corporation of Massachusetts Application July 20, 1940, Serial No. 346,607

1 Claim. (Cl. 16—110)

This invention relates to improvements in fasteners and fastener installations.

The chief object of my invention is the provision of a fastener for securing an elongated hand gripping member or handle over the edge of a shaft. The fastener is designed to be disposed entirely within said handle so as to be completely concealed by the same when the parts are in final assembly.

Referring to the drawing, in which I have illustrated a preferred embodiment of my invention:

Fig. 1 is a plan view of a handle installation partly broken away to show one of my improved fastener members by which the handle is secured to the shaft;

Fig. 2 is a perspective view of my improved fastener member per se;

Fig. 3 is a section taken along the line 3—3 of Fig. 1;

Fig. 4 is a section taken along the line 4—4 of Fig. 1;

Fig. 5 is a section taken along the line 5—5 of Fig. 2;

Fig. 6 is a section taken along the line 6—6 of Fig. 2;

Fig. 7 is a section taken along the line 7—7 of Fig. 2; and

Fig. 8 is a section taken along the line 8—8 of Fig. 2 and showing the manner in which the attaching portion effects biting engagement with the supporting shaft.

Referring to Fig. 1, I have shown a preferred installation of my invention comprising a supporting shaft 1 and a handle 2 secured to the supporting shaft by means of my improved fastener member 3. Although I have preferred to illustrate my invention in connection with a handle installation such as shown by the drawing, it is understood that I do not wish to limit my fastener to that particular use as it may be used in connection with other installations for securing parts together. The shaft 1 is elongated in shape and comprises a body portion 4 providing broad faces 5—5 on opposed sides thereof. The body portion 4 has a preformed portion 6 at a narrow side. The preformed portion 6 is narrower in width than the body portion 4 so that the body portion provides shoulders 7—7 on opposite sides of the preformed portion adjacent its junction with the body portion. A pair of spaced post-like portions 8—8 (Fig 1) extend beyond the preformed portion 6 to support the handle 2, in my preferred installation. Intermediate the post-like portions 8—8 the preformed portion 6 has lateral ribs 9 extending along its entire length on opposed sides thereof and providing inclined camming surfaces 10 and overhangs 11.

The handle 2 is elongated in shape and preferably formed of plastic material. The handle is of generally circular cross-sectional shape and has a radial slot or opening 12 extending the entire length of the handle and intersecting opposed ends thereof. The opening 12 has sufficient width to receive the preformed portion 6 and body portion 4 of the supporting shaft and deep enough to permit the handle to overlie a portion of the sides 5—5 thereof, as most clearly shown in Fig. 3, so that the handle portion completely conceals the preformed portion 6 when the parts of the installation are in final assembly.

Referring in detail to the fastener member 3, I have shown one formed from one piece of sheet metal material. The fastener is elongated in form and of a length substantially equal to the distance between the posts 8—8 of the shaft 1. The fastener provides a base 13 and pairs of opposed spaced yieldable portions 14—14 extending on one side of the base. The pairs of yieldable portions 14—14, herein shown as four, are spaced one from another longitudinally of the fastener, as most clearly shown in Figs. 1 and 2. It will be seen that the pairs 14—14 cooperate with the base 13 to provide a substantially channel-shaped member open at its side away from the base 13 to receive the preformed portion 6 within the channel in a manner to be described. Each of the yieldable portions 14 has a lug or projection 15 pressed inwardly and providing a shoulder or free edge 17 facing the base 13, as most clearly shown in Figs. 4 and 5. Narrow flange portions 18 join each of the yieldable portions 14 with the next adjacent yieldable portion in the same line, in my preferred form, and pairs of opposed attaching portions or wings 19 extend from the ends of the flange portions 18 in a direction away from the base 13 outwardly beyond the plane of the yieldable portions 14. The wings 19 are yieldable so as to engage opposed walls 20—20 of the handle adjacent the opening 12 (Fig. 4) in a manner to be described. Each of the wings 19, in my preferred form, has serrations 21 at its outermost edge for biting engagement with the handle to prevent longitudinal movement of the handle relative to the shaft.

Assembly of the parts of my installation is carried out by moving the yieldable portions 14 over the preformed portion 6 until the free edges 22 (Figs. 4 and 6) of the yieldable portions 14 fetch up against the shoulders 7 of the shaft body 4. During this action the yieldable portions 14 will be expanded outwardly through engagement of the free edges 22 of the yieldable portions with the inclined surfaces 16 of the rib 9 and, after the inwardly struck projections 15 have passed beneath the rib 9, the yieldable portions contract to engage the shoulders 17 behind the overhangs 11 whereby the fastener is firmly secured to the shaft, as most clearly shown in Figs. 3 and 4. Next, the handle 2 is moved relative to the supporting shaft to receive the preformed portion 6 together with the fastener 3 within the opening 12, as most clearly shown in Fig. 4. As a result of the fact that the distance between opposed wings 19 at their outermost ends is greater than the distance between opposed walls 20—20, the wings 19 will be contracted inwardly during relative movement of the parts. When the bottom wall 23 of the opening 12 has fetched up against the post-like portions 8—8, the wings 19 engage the walls 20—20 under spring tension and at an angle to resist any tendency of the handle to pull away from the shaft. Also, the serrated free ends 21 of the wings 19 bite into the walls 20, as most clearly shown in Fig. 8, to prevent longitudinal movement of the handle relative to the shaft.

Thus by my invention I have provided a fastener of inexpensive construction capable of securing a handle to a supporting shaft so as to effect a secure rattle-proof assembly of the parts.

Although I have illustrated and described a preferred embodiment of my invention, I do not wish to be limited thereby because the scope of my invention is best defined by the following claim.

I claim:

A handle installation comprising, in combination, an elongated handle, said handle having an elongated opening which opens along a longitudinal side thereof, a supporting shaft having an elongated metal preformed portion on one side thereof extending longitudinally of said shaft and disposed within said opening, said preformed portion having overhangs extending along opposed sides thereof and terminating short of each of opposed ends thereof, a fastener disposed within said opening securing said handle to said shaft, said fastener having a base and pairs of opposed yieldable portions extending on one side of said base, said pairs of yieldable portions being spaced laterally one from another, projections extending inwardly from said yieldable portions and engaging in snap fastener action behind said overhangs whereby said fastener is secured to said shaft, and yieldable attaching portions integrally joined to said fastener between said pairs of spaced portions and extending away from said base, said last-mentioned attaching portions being movable independently of said first-mentioned attaching portions and having free edges in biting engagement with the walls of said handle within said opening whereby said parts are secured in assembly.

CLEMENT A. WOODWARD.